UNITED STATES PATENT OFFICE.

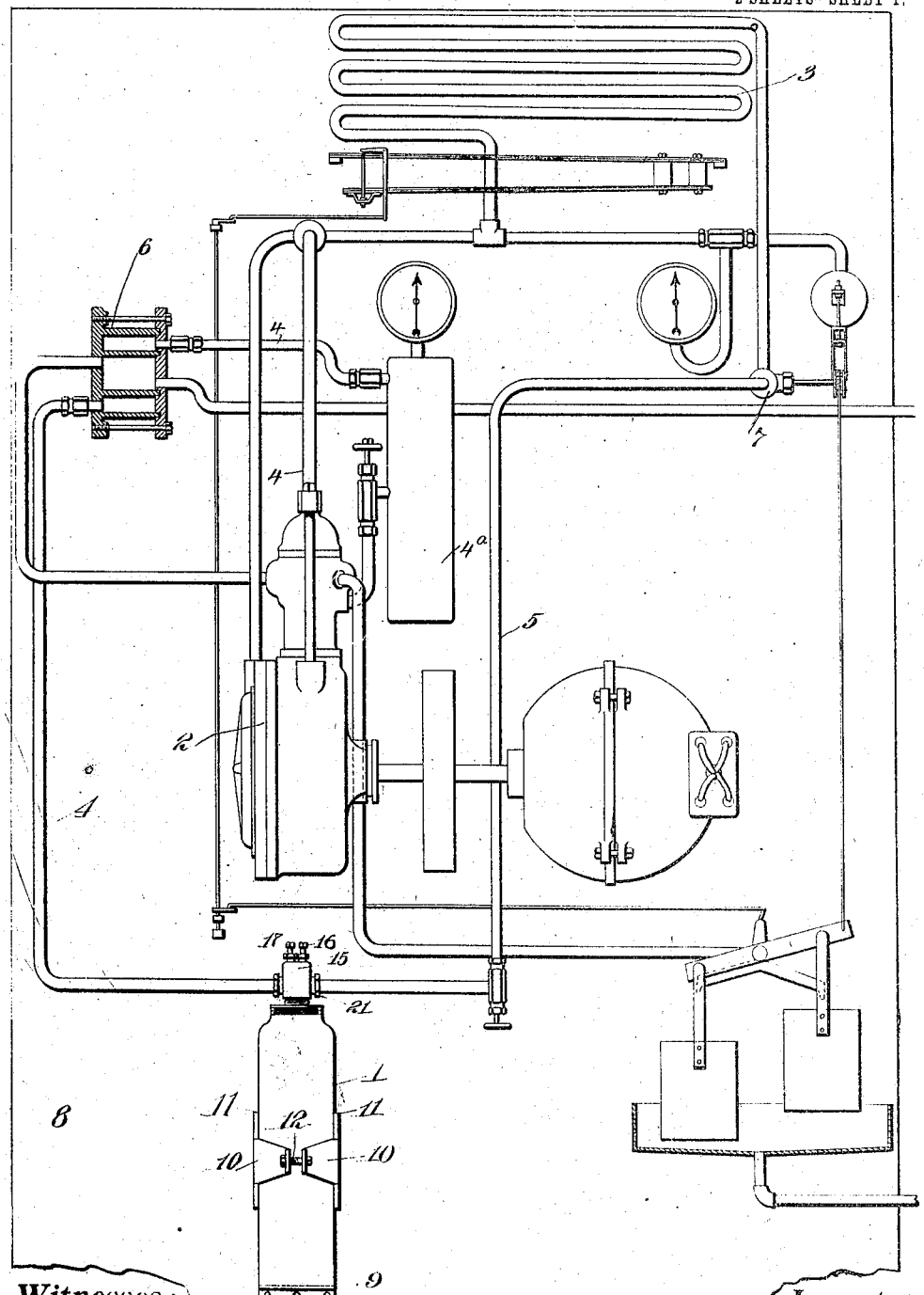

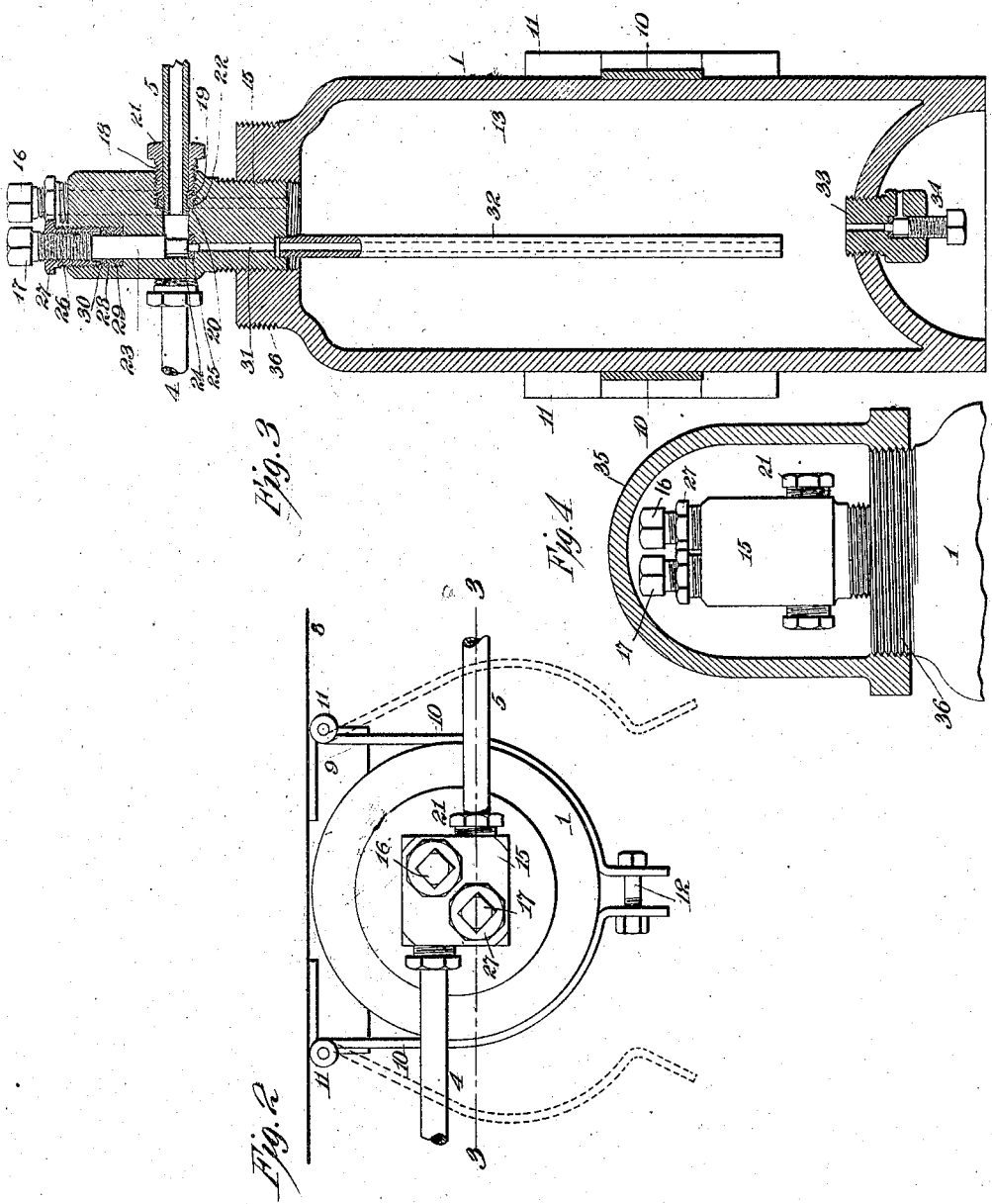

RICHARD WHITAKER, OF NEW BRUNSWICK, NEW JERSEY, ASSIGNOR, BY DIRECT AND MESNE ASSIGNMENTS, TO BRUNSWICK REFRIGERATING COMPANY, A CORPORATION OF NEW JERSEY.

REFRIGERATING-MACHINE.

932,599.

Specification of Letters Patent. Patented Aug. 31, 1909.

Application filed April 27, 1904. Serial No. 205,087.

*To all whom it may concern:*

Be it known that I, RICHARD WHITAKER, a citizen of the United States, residing in the city of New Brunswick, county of Middlesex, and State of New Jersey, have invented a certain new and useful Improvement in Refrigerating-Machines, of which the following is a description.

The present invention relates to improvements in compression refrigerating machines and relates particularly to the circulating system of small isolated plants and means for supplying ammonia thereto.

So far as I am aware, it is at the present time customary in small plants employing a small amount of ammonia, say about 5 or 10 lbs. to provide a tank or receptacle, which tank forms a portion of the circulating system and is filled from a commercial tank, which holds about 50 lbs. of ammonia in liquid form. This tank is provided with valves and connections to the piping of the ice machine so that enough ammonia may be drawn off from the tank to fill the reservoir of the plant. When the reservoir becomes empty, or does not contain sufficient ammonia to allow the machine to be satisfactorily operated, the large tank is again connected and the reservoir filled.

The above described means for supplying ammonia to the apparatus is open to the objections that the constant moving about of a tank holding 50 lbs. of ammonia is expensive, it being understood that it is not ordinarily feasible to keep such a large tank within easy reach of the plant, as 5 or 10 lbs. of ammonia in a small plant will ordinarily last several months. The large tank must ordinarily be transported a considerable distance in order to charge a small machine, which will add to the expense of operating the plant, and is therefore objectionable. Another objection to the plan now in use is the difficulty of making connections with the tank, and the danger of leakage in transferring ammonia from the tank to the reservoir, which makes it necessary to have a skilled person attach a tank, draw off sufficient ammonia to fill the reservoir, and remove the tank.

The object of my invention is to overcome these objections. I attain these objects by the mechanism illustrated in the accompanying drawings in which—

Figure 1 is a diagrammatic view of one form of compression machine. Fig. 2 is a top view of the removable tank; Fig. 3 is a vertical sectional view thereof taken on the line 3—3 of Fig. 2; and Fig. 4 is a view partly in section, showing the top of the tank and the cover therefor.

In all of the views like parts are designated by the same numerals of reference.

In carrying out my invention, I provide a tank, bottle or flask 1, which is secured to any portion of the ice machine, and forms a portion of the circulating system thereof. This tank is removably attached in position, and is provided with valves so that when removed or before being applied its contents will not escape. It is preferably of sufficient size to hold the necessary amount of liquid ammonia used in the system of a small isolated plant, amounting to about 5 or 10 lbs.

The compression apparatus illustrated in Fig. 1 is substantially the same as that described in my Patent July 18, 1905, No. 795,014, but the removable tank 1 is used in lieu of the fixed tank 13 illustrated in that patent.

In Fig. 1 the portions of the compression machine which have a necessary relation to the present invention are the compressor 2, the expansion coil 3 and the tubular circulating system comprising the pipe 4 connecting the tank 1 and the compressor 2, and the pipe 5 connecting the tank 1 with the expansion coil 3. The tank 1 is located as shown in Fig. 1 between the compressor 2 and the expansion coil 3, so that the compressed liquid ammonia will pass from the compressor into the tank, and from the tank will be expanded into the coil 3. The cooler or condenser 6 and the tank 4ª are located within that portion of the system which includes the pipe 4 and the expansion valve 7 is located within that part of the system which includes the pipe 5.

As shown in Fig. 1 the tank 1 is removably secured to the support 8 which also in this embodiment of the invention carries the other parts of the apparatus. To the support 8 is secured a shelf or bracket 9 upon which the tank 1 rests, and arms 10—10. These arms are hinged at 11, to the support 8, so that they can be swung outward as shown in broken lines in Fig. 2 to permit the ready attachment or removal of the tank.

The free ends of the arms are secured together by a suitable means 12 that shown consisting of a bolt.

The tank 1, shown more particularly in Fig. 3, comprises a shell 13 made sufficiently strong to withstand the necessary pressure. It is provided with a threaded opening 14 at the top within which is inserted a plug 15. Within the plug 15 are the two valves 16 and 17. The valve 16 communicates with the pipe 4, and the valve 17 with the pipe 5. These pipes are provided at their extremities with unions or connections 18 each of which comprises a washer 19 secured to the threaded extremity of the pipe, and which is forced against the seat 20 by a gland 21; packing 22 making a tight joint. Each of the pipes 4 and 5 may be provided with this form of coupling, although this is not necessary as other forms may be used, and each of the pipes is sufficiently flexible to allow them to be bent outward in attaching or detaching the tank 1. Each of the valves 16 and 17 as shown in Fig. 3 comprises a stem 23 having a bearing portion 24 which is adapted to rest upon a soft metal seat 25. The stem 23 is provided with threads 26 which engage within the threaded interior of a plug 27 to support the stem and permit it to be adjusted. The exterior of the plug is threaded to engage with threads within an opening 28, within which is arranged a packing 29 and a washer 30, the plug 27 serving also as a gland. The outward extremities of the stem 23 are preferably made square or hexagonal as shown so that they may be turned by a wrench by means of which the stem may be rotated and the valve opened or closed. The valve seats 25 communicate with the interior of the shell 13 by means of openings 31, that valve which communicates with the pipe 5 having a depending pipe 32 so that the greater portion of the contents of the tank may be drawn off. This pipe 32 does not extend down quite to the bottom of the tank, but ends a slight distance above it as shown, so that any impure substances contained in the ammonia will not be drawn off when the device is being used as a part of the circulating system. The discharge tube 32 having its open end below the top of the tank will draw off the ammonia from the body thereof and oil or other light substance floating upon it will not be drawn off. At the bottom of the shell is a plug 33 provided with a valve 34 for drawing off the contents or residue within the shell when such is necessary. The valve 34 will be of use in drawing off oil, should such get within the tank, when the latter is removed from the machine. The plug 15 may be removed from the shell for the purpose of repairing the valve or cleaning the interior of the shell, and serves as a ready means for introducing the pipe 32 within the shell. The plug 15 and valves may be protected during transportation by a removable cover 35. This cover is preferably provided with an internally threaded base, which engages with the threaded neck 36 of the tank, so that it may be readily removable.

In accordance with the provisions of the patent statutes, I have described the principle of my invention, together with the apparatus which I now consider to represent the best embodiment thereof; but I desire to have it understood that the apparatus shown is merely illustrative and that the invention can be carried out in other ways.

Having now described my invention what I claim and desire to secure by Letters Patent, is:—

The combination with the tubular expansion system of a compression refrigerating machine, of a tank for holding anhydrous ammonia and comprising a shell having a threaded opening in its upper end, a threaded plug in said opening having two vertically disposed valves, unions in the sides of said plug respectively communicating with said valves and respectively connecting said plug with the piping connected with the compressor and the piping connected with the expansion coil, and a depending pipe extending down into said shell and connected with the valve and piping which communicates with said coil, said tank being located in the system between said compressor and said coil so that the fluid may circulate through it and said tank be readily detachable from the system; substantially as set forth.

This specification signed and witnessed this 25 day of April, 1904.

RICHARD WHITAKER.

Witnesses:
EDWARD MORRIS,
J. L. W. CARBERRY